United States Patent [19]

King

[11] 3,972,734
[45] Aug. 3, 1976

[54] THERMAL DEFERRED ACTION BATTERY
[75] Inventor: Ellwood J. King, Towson, Md.
[73] Assignee: Catalyst Research Corporation, Baltimore, Md.
[22] Filed: Dec. 27, 1957
[21] Appl. No.: 705,713

[52] U.S. Cl. .................................. 136/90; 136/83 T
[51] Int. Cl.[2] ........................................... H01M 6/36
[58] Field of Search ............ 136/90, 90.5, 120, 153, 136/153 S, 133, 83 T

[56] References Cited
UNITED STATES PATENTS

| 856,162 | 6/1907 | Kitsee | 340/228 |
|---|---|---|---|
| 963,852 | 7/1910 | Benko | 136/86 |
| 2,422,045 | 6/1947 | Ruten | 136/107 |
| 2,462,880 | 3/1949 | Mandel | 136/118 |
| 2,519,527 | 8/1950 | Wilkinson | 136/111 |
| 2,564,495 | 8/1951 | Mullen | 136/90 |
| 2,631,180 | 3/1953 | Robinson | 136/83 |
| 2,632,782 | 3/1953 | Coleman et al. | 136/125 X |
| 2,690,465 | 9/1954 | Broder | 136/153 |
| 2,696,513 | 12/1954 | Lehovec | 136/83 |
| 2,798,895 | 7/1957 | Nowotny | 136/111 |
| 2,847,493 | 8/1958 | Smyth et al. | 136/83 |
| 3,518,125 | 6/1970 | Fischbach | 136/90 |

OTHER PUBLICATIONS

Handbk. of Chem. & Phys.; 36th Ed.; Chem. Rubber Pub. Co., Cleveland; 1954, p. 1651.
Goodrich et al., J. Electrochem. Soc. pp. 207c, 208c, Aug. 1952.
McKee, "Tenth Annual Battery Research and Development Conference" pp. 26–28, May 23, 1956.

Primary Examiner—Richard E. Schafer
Attorney, Agent, or Firm—Brown, Critchlow, Flick & Peckham

EXEMPLARY CLAIM

1. In a battery, at least two cells comprising a first cell and a second cell spaced from, but adjacent to, said first cell, each of said cells having an anode and a cathode and having a solid electrolyte between the opposing surfaces of said electrodes in each cell, one of said electrodes in each of said cells being formed of a thin rectangular metal blank folded along its transverse axis with the resulting rectangular portions thereof being in parallel planes and having the opposing side edges of those resulting rectangular portions of the folded member sealed together, whereby substantially flat rectangular receptacles each with an open end are formed, an extension from a side wall of said receptacle electrode of said first cell at its open end, said extension being of a size that is as large as possible consistent with fitting within the receptacle electrode of said second cell and being disposed in said receptacle electrode of said second cell, said receptacle electrode of said first cell and said extension being a single piece of metal, a second metal on the surfaces of said single piece of metal in one of said cells, whereby the resulting unit is an anode in one of said cells and a cathode in the other, said extension being deformed adjacent the end of the receptacle electrode with which it is integral and lying in a plane above and substantially parallel to the plane of the receptacle electrode with which it is integrally connected, whereby the cells of said battery form a stack of cells.

3 Claims, 9 Drawing Figures

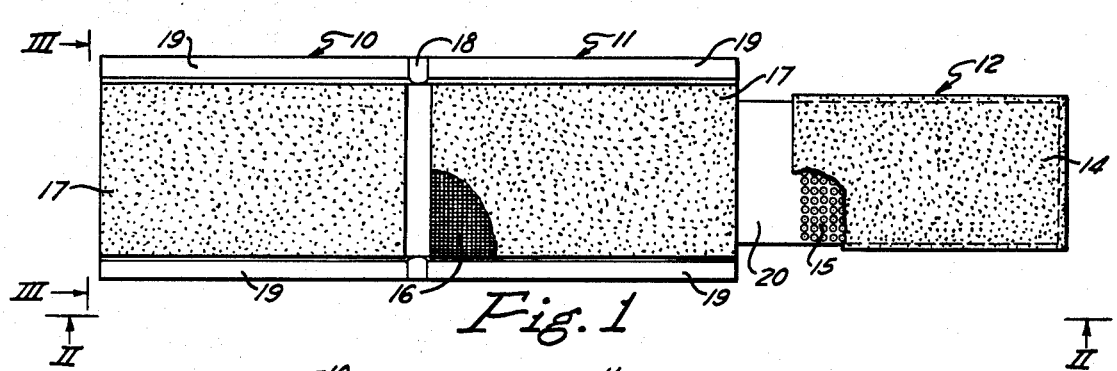
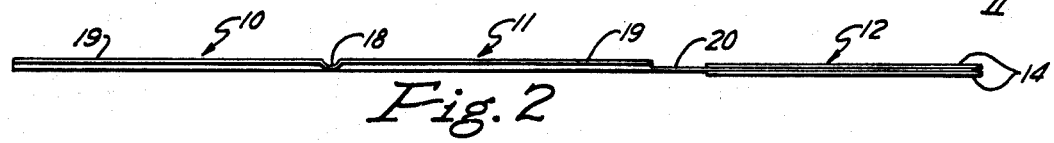
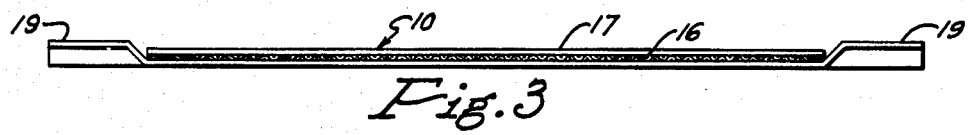
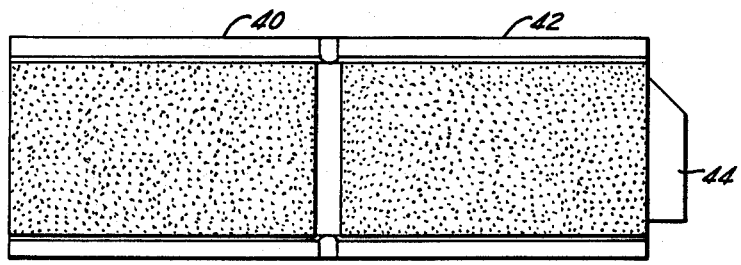
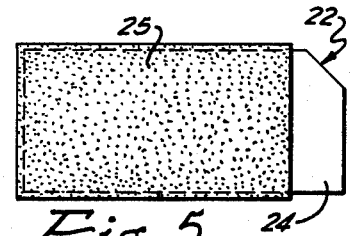
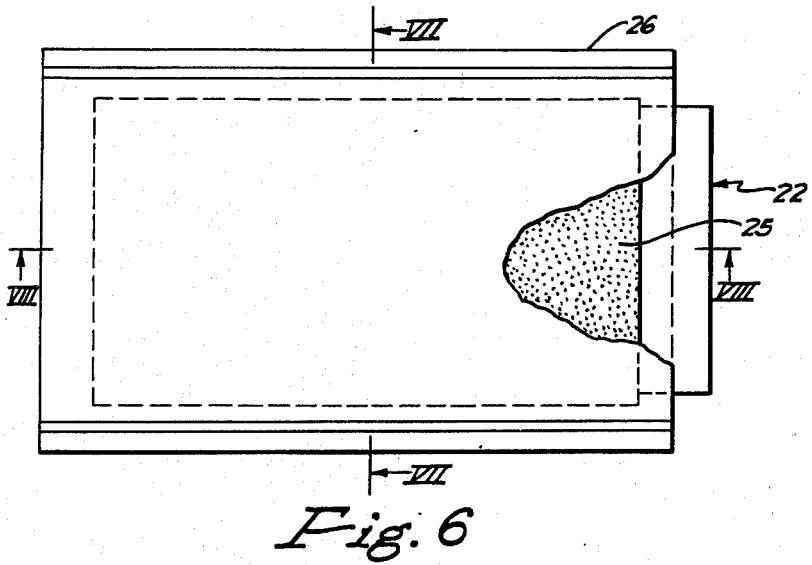
INVENTOR.
ELLWOOD J. KING

THERMAL DEFERRED ACTION BATTERY

This invention relates to thermal type deferred action cells and batteries.

Thermal type deferred action cells and batteries are inactive at normal atmospheric temperatures, and they become active only upon heat being supplied thereto. Such cells include at least one positive plate and one negative plate and an electrolyte that is solid and inactive at ordinary temperatures but which becomes functionally active when heat is supplied, usually but not necessarily in an amount sufficient to melt, or fuse, the electrolyte. Such cells become and remain active only while the electrolyte is hot.

A major object of the present invention is to provide thermal type deferred action cells and batteries which can provide a very substantial quantity of current, that can be made extremely compact, that can be produced, in the instance of batteries, having relatively low electromotive force (emf), and that are characterized by being durable, of long shelf life, and shock resistant.

In accordance with this invention, such thermal cells are formed of an electrode of one metal that is enclosed within an envelope or receptable of another metal serving as a case for the cell, with an appropriate electrolyte disposed between the two. In the preferred embodiment a metallic electrode blank is coated, in part, with a different metal to provide positive and negative electrode areas on the same blank. Such a blank is then enclosed by folding an electrode of, for example, the base metal in such manner that the coating metal is opposite that inside surfaces of the enclosing electrode. The electrolyte is disposed between the coated surface of the blank and the inner surface of the enclosing or receptacle electrode. In this general manner, a very compact and rigid cell structure is provided that may be developed, in a manner hereinafter to be described, into batteries of desired emf with a high current capacity.

Cells made in accordance with this invention comprise a metallic anode, a metallic cathode, and a suitable solid electrolyte. The materials used for these elements may be chosen with a view to such factors as the electrical characteristics desired, economics, and the like as the fabricator desires. However, I have found that nickel, suitably in the form of the alloy, Inconel, is a very satisfactory base material from which the coated electrode blanks may be made. Part of the nickel blank can be coated with calcium which serves as the anode relative to an outer nickel electrode which then becomes the cathode. Other typical electrode pairs include Mg-Cu, Mg-Fe, Mg-Pt and Ca-Ag.

A wide variety of electrolytes applicable in the practice of the invention are, of course, available. The major criteria are that the electrolyte shall be and remain solid and non-conductive until the cell is to function, and that it shall become active, or conductive, when heated, as by actuation of an exothermic composition, and that it shall then act as an electrolyte in cooperation with the electrodes to supply the desired current. The electrolyte should be thermally stable, and the melting point should be relatively low, e.g., 150° to 500°C, to provide for fast activation by a small amount of heat and also for longer life for a given heat supply.

Thus, single salts or mixtures of salts having melting points applicable to any given case in question may be used. Commonly it is preferred to use eutectic compositions of two or more salts because thereby desired low melting compositions are supplied. Other important physical properties of the electrolyte are the boiling point, for the salt should not vaporize under the heat supplied, and the heat of fusion and the specific heat. The coefficient of thermal expansion is significant only in that the cell components should not show excessive relative dimensional changes in order to avoid creation of undesirable stresses within the cell.

Chemically, the electrolyte should for most purposes not undergo reactions, other than electrochemical, with the cell components, i.e., the electrodes or electrolyte carrier, if any, although where brief action only is necessary that factor becomes unimportant. Likewise, the electrolyte should not ordinarily undergo gas liberating reaction within itself while heated.

Most suitably the electrolyte is supported by a carrier, of which a variety are available. The major criteria are that the carrier shall be and remain solid and non-conductive throughout the fabrication, storage, and functional life of the cell, be porous to the ionic migration of the fused electrolyte during the functional life of the cell, and by maintaining a definite thickness by a physical spacer between the electrodes when the electrolyte is molten. Thus metal oxides, glass fiber products, or ceramics of high melting point and insolubility applicable to any given case may be used. Commonly it is preferred to use a flexible tape woven or felted from fibers of a high melting point, insoluble, high dielectric material or from mixtures of two or more kinds of such fibers.

For many purposes it is now preferred to use an electrolyte pad consisting of an electrolyte carrier impregnated with electrolyte. Such electrolyte pads are prepared, for example, by passing a ribbon of cleaned woven fiberglass tape, asbestos tape or analogous material through a melt of the preferred electrolyte at a controlled temperature and a controlled rate thereby controlling the weight of the electrolyte impregnated in the carrier. The impregnated tape is then cooled in such a manner that all components are solid. Electrolyte pads of preferred shape, composition and weight are then cut from the tape. Such electrolyte pads consist of two distinct components, one being the inert carrier portion that remains continuously solid through the fabrication, storage and functional life of the thermal cell, and the other being the electrolyte portion that is liquid during impregnation of the carrier, is solid during storage life of the thermal cell, and is molten during the funtional life of the thermal cell. Typical electrolytes useful in the practice of the invention are lithium hydroxide (m.p. 450°C), potassium hydroxide (m.p. 360°C), binary mixtures such as lithium nitrate-lithium hydroxide (m.p. 370°–380°C), the lithium chloride-potassium chloride eutectic (m.p. 364°C) and the lithium hydroxide-lithium chloride eutectic (m.p. 290°C).

With most combinations of electrodes and electrolytes a depolarizer is desirably present. This may be accomplished by the use of a variety of readily reducible oxidizing but thermally stable agents that may be incorporated in the electrolyte itself, or if the depolarizer tends to exert an undesirable action at the electron source it may be applied directly to the surface of the electron sink, or negative electrode. It is even possible to supply a depolarizer by chemical reaction within the cell. Among the depolarizers that will function in the electrolyte, potassium dichromate ($K_2Cr_2O_7$), potassium chromate ($K_2CrO_4$), molybdic oxide ($MoO_3$), tungstic oxide ($WO_3$), and calcium chromate ($CaCrO_4$) have been found to be satisfactory with various electrode pairs. The depolarizer may be in solution or in suspension in the electrolyte, or be applied to the cathode.

One mode of pasting depolarizer to an electrode is to paint the electron sink with a water slurry of calcium chromate ($CaCrO_4$) and lead chromate ($PbCrO_4$). A negative electrode depolarizer found to be of value is composed of four parts of $CaCrO_4$ and one part of $PbCrO_4$.

Deferred action thermal cells and batteries require a supply of heat to activate them. This is accomplished by associating with the cell or battery a combustible composition that undergoes exothermic reaction without the liberation of any substantial amount of gas. In general such compositions comprise an oxidizable substance and an oxidizing agent, with or without an inert diluent to modify the rate of reaction. For most purposes, I prefer compositions comprising one or more finely divided metals having high heats of combustion, as the oxidizable substance, and as the oxidizing agent any of a variety of inorganic substances that react therewith but without liberation of any substantial amount of gas, examples being chlorates, perchlorates and nitrates, particularly of the alkali metals, as well as chromates, iron oxide, manganese dioxide and others. The composition must, of course, be capable of ignition by such means as a percussion primer or the well known electric matches. Also, it must be capable of liberating heat rapidly. Other criteria are that the composition must be stable under cell storage conditions, and have certain ignition at very low ambient temperatures.

The particular heating composition to be used will depend upon the requirements of the cell, such as the rapidity with which it is to function, the duration of its functional life, and the amount of heat necessary to effect those ends, and to fuse the electrolyte. Some of these exothermic compositions liberate larger amounts of heat, or react more rapidly, than others, so that the requirements of any particular cell can be suppled readily from the known compositions.

Likewise, the characteristics of these heat-liberating compositions may in general be modified by adding or altering the content of an inert diluent, such, for example, as diatomaceous earth and similar incombustible and non-reactive materials. Of course, where the cells are subjected to such forces as shock, impact, centrifugal force, or high acceleration, the composition should be insensitive to such forces. By way of illustration, reference may be made to the following compositions that have been found to be satisfactory for the purposes of the invention.

A mixture of zirconium metal (Zr) powder (−200 mesh) and powdered red iron oxide ($Fe_2O_3$) in stoichiometric proportions (41% Zr, 49% $Fe_2O_3$) with 10 percent by weight of diatomaceous earth as diluent exhibits fast propagation of combustion with good heat capacity.

Another composition is one consisting of 70 to 80 percent of zirconium-barium chromate heat powder and 20 to 30 percent of inorganic fibers. The heat powder may contain about 21 to 34 percent of zirconium powder and 66 to 79 percent of barium chromate powder. This is mixed in wet slurry with the inorganic fibers. The inorganic fibers can be various combinations of aluminum silicate, glass fibers, and asbestos if desired. This mixture is coated on a paper made of the same inorganic fibers. The calorific value of this paper may be varied from 250 to 500 calories per gram by varying the proportions of the components.

Another composition is composed of, by weight, 22 percent nickel (Ni) powder, 5 percent zirconium (Zr) powder, 16.8 percent potassium perchlorate ($KClO_4$) and 56.2 percent barium chromate ($BaCrO_4$). This composition ignites easily at low temperatures. It produces about 670 gram calories of heat per cubic centimeter after being compressed at 6000 psi. The relative percentages of the four components may be varied over a wide range to give various burning rates and various heats of combustion per unit volume. The composition just stated after being compressed at 12,000 psi burns at the rate of 0.1 inch per second, or a burning time of 10 seconds pr inch. As exemplifying how the burning characteristics may be varied, if the percentage of zirconium be held constant and the nickel and potassium perchlorate be maintained in substantially stoichiometric ratio, with the barium chromate being varied as a diluent, a burning time 3 seconds per inch is to be had with 25 percent of potassium perchlorate and 35.5 percent each of nickel powder and barium chromate. On the other hand, at approximately 12 percent of potassium perchlorate, 15 percent of nickel powder and 67 percent of barium chromate the burning time is increased to 18 seconds per inch.

When nickel is used in these compositions it is preferred that it be prepared by distillation of mercury (Hg) from a nickel-mercury amalgam as described and claimed in U.S. Pat. No. 1,893,879, issued Jan. 10, 1933, on an application filed by Joseph C. W. Frazer et al. Such nickel powder may be stabilized, if desired, as described and claimed in U.S. Pat. No. 2,487,632, issued Nov. 8, 1949 on an application filed by O. G. Bennett. This form of nickel powder is preferred because it has been found to be much more active in these combustible compositions than nickel produced in any other way.

Another composition is one consisting of 9.6 percent, by weight, of granular aluminum (Al) and the balance barium chromate. After being compressed at 10,000 psi it liberates 423 gram calories per gram.

The invention will be described further in conjunction with the appended drawings in which FIG. 1 is a plan view of a cell blank that is used to provide a cathode of one cell and an anode of a second cell;

FIG. 2 is a side view of the blank of FIG. 1 taken along line II—II;

FIG. 3 is an end view of the blank of FIG. 1, but to a larger scale, taken along the line III—III;

FIG. 4 is a plan view of a blank that is used as an outer or receptacle electrode of an end cell;

FIG. 5 is a plan view of a blank used as a central or inner electrode of an end cell;

FIG. 6 is a plan view of a complete cell showing the relative disposition with respect to one another of its two electrodes;

Figure 9:
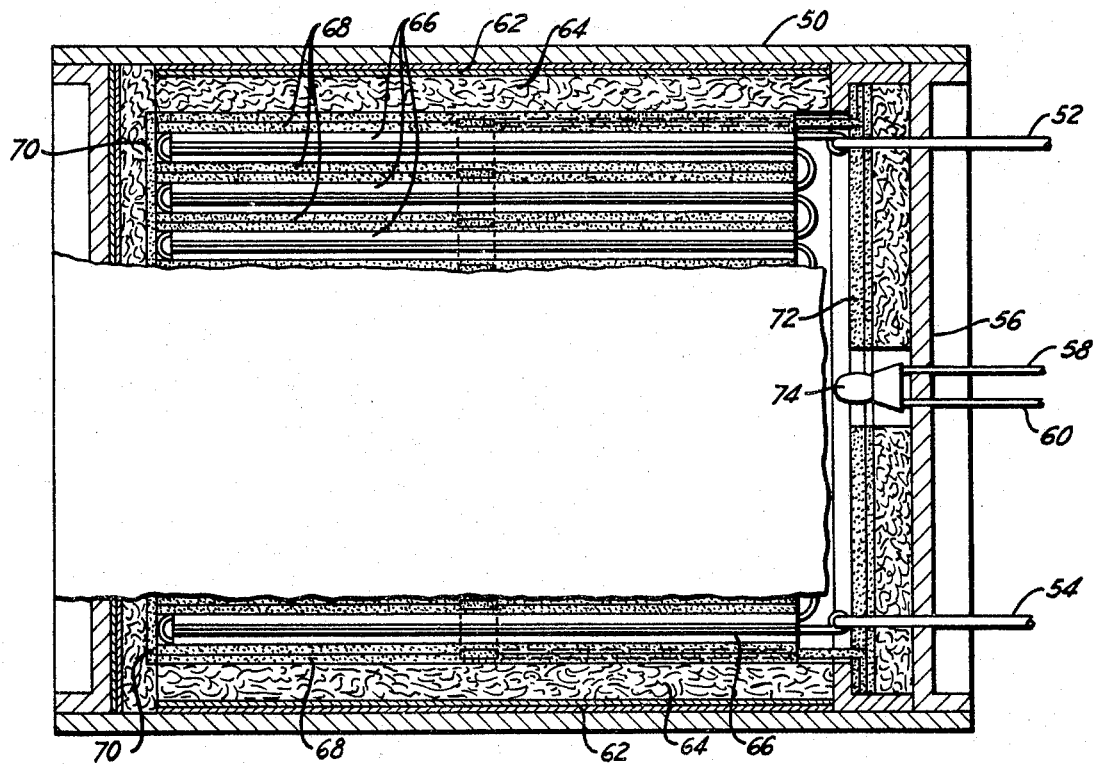
FIG. 9 is a view, partly in elevation, of a complete battery structure made in accordance with the present invention.

Referring now to the drawings, the blank shown in FIG. 1 includes three main sections 10, 11 and 12. Suitably the blank is formed of very light gauge (0.005 inch thick) sheet nickel. Sections 10 and 11 are substantially equal in size and are rectangular in shape. Section or extension 12 is of size and shape adapted to fit within an envelope formed by folding section 10 onto section 11. While section 12 therefore must be sufficiently small to go within the resulting envelope, it is desirable, in the interests of obtaining as high a current discharge as possible, to make that portion as large as is consistent with the foregoing requirement. In other words, the opposing faces of the electrodes are as nearly equal as possible to maximize the rate of discharge in use.

The blank of FIG. 1 actually functions to provide two separate electrodes. The receptacle formed from sections 10 and 11 constitutes one of the electrodes, for example if made from nickel it will be the cathode where a nickel-calcium couple is used. The anode is formed from section 12 by treating it with a second metal, such as by providing a layer of calcium 14, that covers substantially the entire section. The calcium (or other second metal) may be placed on 12 in any way desired; however, in advantageous method of application involves perforating section 12, much in the manner that a cheese grater is perforated, to provide oppositely extending projection points 15, and then rolling calcium sheets on both sides of the resulting structure. Other methods of joining calcium to a metal base, such as by depositing it as vapor under vacuum, will occur to those skilled in the art and may be used in practicing the present invention.

It will be observed from the cutaway area of section 11 that the blank serving as the enveloping or receptacle electrode is provided with a screen or wire mesh 16 affixed thereto. The wire mesh suitably is made of the same metal as the blank. Where a high rate of discharge is needed in a cell, it is advantageous to provide a depolarizer adjacent the cathode. The screen 16 serves as a carrier for a depolarizer 17; such screens are provided on each of the sections 10 and 11 of the cathode. The relative disposition of the depolarizer and the screen is evident from the end view of the blank shown in FIG. 3. The use of a depolarizer and screen adds some thickness to the unit. Consequently, and for the additional purpose of providing sufficient space to receive the central electrode, the blank most suitably is stamped so that the central area thereof is recessed longitudinally (FIG. 3)

In forming an electrode with a blank as shown in FIGS. 1, 2, and 3, the blank is prepared with a depolarizer and a second metal in place as just described. Section 10 is then folded along its transverse axis, as along folding trough 18, a depression stamped into the blank, until the depolarizer on section 10 is in face-to-face relationship with the depolarizer of section 11. The side edges 19 of sections 10 and 11 are then crimped or welded together to provide a seam through its length. The seamed area is then folded upon itself (see the end areas of the cell in FIG. 7) to complete the seal and to reduce the width of the unit. The resulting structure constitutes an envelope-shaped electrode, or a receptacle shaped electrode with an open end, adapted to receive a central electrode, and a second electrode integral with and extending from an end edge of one of the sides of the enveloping or receptacle electrode.

In constructing a cell, such as a first end cell of a battery, with an electrode receptacle such as just described, a central electrode with the second metal thereon (calcium) is prepared. Such an electrode 22 covered with the second metal 25 is shown in FIG. 5. Since this electrode blank serves as an electrode and as a means to provide one lead for the battery of cells, it is provided with an uncoated neck area 24 to facilitate connection of a battery lead. Prepared electrolyte pads are placed on each surface of the electrode 22 and the resultant unit then is placed on section 11 of the blank of FIG. 1. The blank is then folded to form the receptacle in the manner just described.

Figure 7:
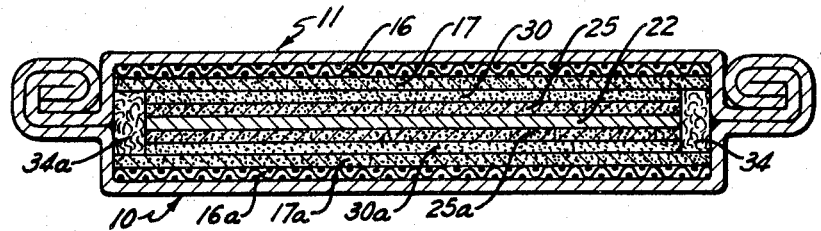
FIG. 7 is a cross section of the cell of FIG. 6 taken along line VII—VII.

In FIG. 6 is shown a completed cell, in plan showing the relative disposition of a central electrode 22 with respect to the side walls of the receptacle electrode 26. A cross section of this cell is shown in FIG. 7. Considering FIG. 7, from top to bottom the elements in a completed cell are the outside enveloping section 11 of the receptacle electrode 26, screen 16 affixed to that section which holds a layer 17 of a depolarizer. The electrolyte that is used is shown as a pad of electrolyte 30. Adjacent the electrolyte pad is the calcium deposit 25 that is on the central electrode 22. From the middle to the bottom of the cell the order of the foregoing components is reversed. On the central electrode 22 is the calcium deposit 25a which is in contact with the electrolyte pad 30a. Adjacent the electrolyte pad is depolarizer 17a which is compressed into screen 16a, which in turn is affixed to the surface of the outer electrode 10. To prevent accidental contact between the electrodes of the cell, it is desirable to include insulating pads around the edges of the central electrode. In FIG. 7, felt pads 34 and 34a represent the insulating means that are along the sides of the central electrode.

Figure 8:
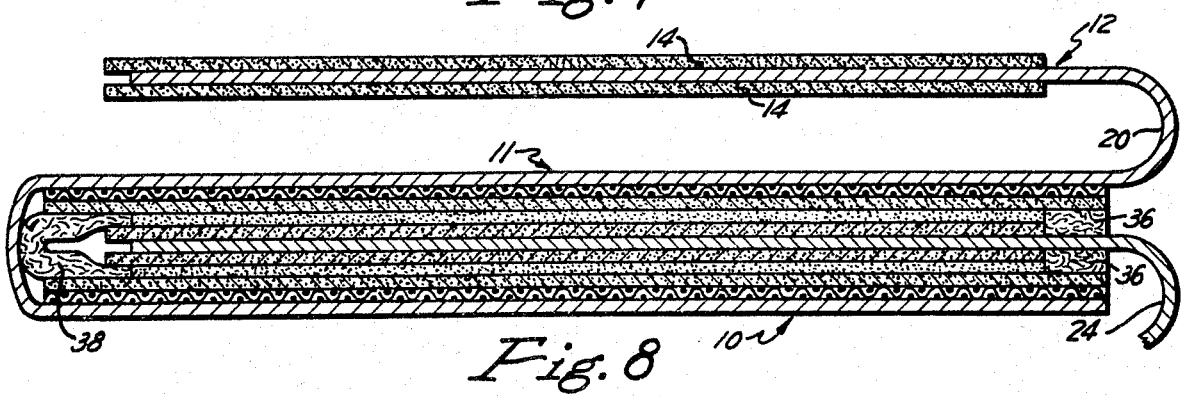
FIG. 8 is cross-section of the cell of FIG. 6 taken along line VIII—VIII.

As noted hereinbefore, the first end cell in addition to all other cells except the final end cell provides an adjacent cell with an electrode. The relative disposition of the auxiliary electrode of the first end cell is shown in FIG. 8, which is a cross section of the cell of FIG. 6 taken along line VIII—VIII. In FIG. 8 the auxiliary electrode of the completed end cell is shown in the plane above and parallel to the completed cell. This is accomplished by bending the area 20 of section 12 as shown. Section 12, of course, is coated with the second metal as hereinbefore mentioned. In this drawing the numerals 36 and 38 constitute the insulating members, for example, felt pads, that are used at the ends of the central electrode of the cell to prevent accidental contact between the electrodes and electrolyte leakage during active life. The neck area 24 of the central electrode is shown bent down. In use, an electrical lead (not shown) would be attached thereto.

In a battery of cells in accordance with this invention, there is at least one central cell. Such a cell is formed in the same general manner as described for the first end cell. However, the central or inner electrode of a central cell is the extension from the end of a side wall of the receptacle electrode of the next adjacent cell. Accordingly, there is no need to provide a special central electrode as in the instance of forming the first end cell.

In assembling a central cell, a prepared blank, such as that shown in FIGS. 1, 2 and 3, is folded around an element 12 of an adjacent cell to serve as its central electrode, with electrolyte pads in place, to form the receptacle electrode. The extension from the resulting receptacle electrode of the central cell is then available to serve as the inner electrode of the next central cell or the second end cell, depending on the number of cells desired.

The final end cell of a battery of cells need provide no electrode for an adjacent cell. Consequently, the structure of the blank used for such a cell may differ from the blank shown in FIG. 1. Such an end cell blank is shown in FIG. 4. This blank has three main sections 40, 42 and 44. Sections 40 and 42 serve the same function as do sections 10 and 11 of the blank of FIG. 1. The tab extension 44 is provided as a means to which is connected a terminal lead for the delivery. In forming this cell, the blank with the depolarizer on its electrode surfaces is folded about the extension electrode of the next adjacent central cell and the side edges are sealed as with the other cells.

Various assemblies of cells including a first end cell, at least one central cell and a second or final end cell may be made. The number of central cells used in a battery is determined primarily by the desired voltage or the case in forming a group of battery units into a variety of batteries each of different voltage. In other words, it may be found that a basic battery structure of say four, five, six or any other number of cells gives the maximum flexibility in preparing batteries for commercial purposes; consequently, a standard unit may be made and be used, as needed, for making batteries of other voltage.

This invention is particularly useful for these objects. The planar or stack-like arrangement of the cells in a battery contributes to the compactness of the unit. The use of a single piece of metal to form electrodes of two distinct cells adds to the strength of the structure.

The batteries made in accordance with this invention are intended for use where a high current discharge, relatively low voltage, thermal battery is needed. For the uses now known compactness is particularly desirable. On the other hand, to obtain a high current from a battery requires a large electrode area, since the quantity of current from a battery is proportional to the electrode area. It can therefore be seen that whereas compactness is desired on the one hand, the companion desideratum of a large current discharge requiring large electrode area is in conflict therewith. In the present invention this conflict is resolved by minimizing bulk attributable to anything other than the electrodes. This may be observed upon consideration of FIGS. 6, 7 and 8. It will be noticed that nothing is present, other than is absolutely necessary, to increase the thickness of the cell. Similarly the length and width of the electrodes are substantially the length and width of the cell, actually being different only in that additional width used for the crimped or sealed side edges and the external portions 20 and 24 of the central electrodes. It may also be noted that the receptacle electrode functions as the case for the cell, avoiding the need to add anything for that purpose.

Batteries that are made in accordance with this invention include the completed individual cells, the battery terminals, a combustible material to activate the cells, a means to actuate the combustible, and a suitable casing. The structure of a typical battery is shown in FIG. 9. A hermetically sealed canister or case 50, suitably of light gauge sheet iron or steel, is provided to receive a plurality of cells or groups of cells according to the voltage desired in the completed battery. The "positive and negative" terminal leads 52 and 54, respectively, extend through the side (or top) 56 of the battery case 50 for ready access upon use, as do the terminal leads 58 and 60 of an electric match combustion initiator. In the battery shown, the cell units are series connected in the manner already described. Consequently, the first end cell and the final end cell are at opposite ends of the battery.

Within the limits of operability of the combustion material used and similar considerations, the cell units may be placed in the battery case in any manner desired. One arrangement found suitable involves lining the battery case with insulating and shock absorbing material, such as asbestos and felt pads 62 and 64, respectively. Other materials that can be used include, by way of example, fiber glass cloth and mica strips. These linings serve both as electrical insulation and as heat insulation, the latter to isolate the cells from the influence of ambient conditions and to retain heat from the combustible material in the area of the cells once the unit is actuated.

Individual cells and groups of cells are arranged with heat pads, of any composition as described hereinbefore, interspersed among them, and are then placed in the case within the lining. The heat pads are about the same length and width as the cell, and have powder trains connecting them to one another. In the drawings, the cells are designated 66, the heat pads are 68 and the powder train is 70. On the end of the stack of cells is placed a pad 72 carrying the electric match 74 used to set off the powder train, followed by layers of insulation and shock absorbing pads as desired. The powder train ignition means, which is the electric match 74 in this embodiment, is placed adjacent the end of the powder train to insure ignition. The sealing member 56 closes the case 50, with the battery leads and combustion initiator leads extending therethrough in sealed relation. Where necessary the closure 56 is hermetically sealed to the remainder of the case.

The cells and batteries of this invention may be used for any of the applications in which delayed action batteries now find use. As is apparent, a particular characteristic of the disclosed structure that is of special interest is the fact that rugged batteries of high current discharge per unit of size now can be manufactured. An application of such a battery is to supply current rapidly when needed in various air-borne applications.

In accordance with the provisions of the patent statutes: I have explained the principle of my invention and have described and illustrated what is now believed to represent its best embodiment. However, I desire to have it understood that, within the scope of the appended claims, the invention may be practiced otherwise than as specifically described and illustrated.

I claim:

1. In a battery, at least two cells comprising a first cell and a second cell spaced from, but adjacent to, said first cell, each of said cells having an anode and a cathode and having a solid electrolyte between the opposing surfaces of said electrodes in each cell, one of said electrodes in each of said cells being formed of a thin rectangular metal blank folded along its transverse axis with the resulting rectangular portions thereof being in parallel planes and having the opposing side edges of those resulting rectangular portions of the folded member sealed together, whereby substantially flat rectangular receptacles each with an open end are formed, an extension from a side wall of said receptacle electrode of said first cell at its open end, said extension being of a size that is as large as possible consistent with fitting within the receptacle electrode of said second cell and being disposed in said receptacle electrode of said second cell, said receptacle electrode of said first cell and said extension being a single piece of metal, a second metal on the surfaces of said single piece of metal in one of said cells, whereby the resulting unit is an anode in one of said cells and a cathode in the other said extension being deformed adjacent the end of the receptacle electrode with which it is integral and lying in a plane above and substantially parallel to the plane of the receptacle electrode with which it is integrally connected, whereby the cells of said battery form a stack of cells.

2. A cell according to claim 1 in which said cathode is made of nickel, and said second metal is calcium.

3. A battery of at least three cells comprising a first end cell constituted of an anode, a cathode and a solid electrolyte between the surfaces of said electrodes within said first end cell, one of said electrodes being formed from a rectangular metal blank folded along its transverse axis with the resulting rectangular portions thereof being in parallel planes and having the opposing side edges of the resulting rectangular portions of the folded member sealed together, whereby a substantially flat rectangular receptacle having an open end is formed, the other of said electrodes comprising a thin metal blank fitted within said receptacle electrode, an extension from a side-wall of said receptacle electrode from its open end, said extension being of a size that is as large as possible consistent with fitting within said receptacle electrode, said extension and said first end cell receptacle electrode comprising a single piece of metal; at least one central cell constituted of an anode, a cathode and a solid electrolyte between the surfaces of said electrodes within said central cell, one of said electrodes comprising the extension of the side-wall of said receptacle electrode of said first end cell, the other of said electrodes of said central cell being formed from a rectangular metal blank folded along its transverse axis with the resulting rectangular portions thereof being in parallel planes and having the opposing side edges of those resulting rectangular portions of the folded member sealed together, whereby a substantially flat rectangular receptacle having an open end is formed, an extension from a side-wall of said receptacle electrode of said central cell from its open end, said extension being of a size that is as large as possible consistent with fitting within said receptacle electrode, said extension and said central cell receptacle electrode comprising a single piece of metal; a second end cell constituted of an anode, a cathode and a solid electrolyte between the surfaces of said electrodes within said second end cell, one of said electrodes comprising the extension of the side-wall of a receptacle electrode of a central cell, the other of said electrodes of said second end cell being formed from a rectangular metal blank folded along its transverse axis with the resulting rectangular portions thereof being in parallel planes and having the opposing side edges of those resulting rectangular portions of the folded member sealed together, whereby a substantially flat rectangular receptacle having an open end is formed; a first metal lead in electrical contact with one of said electrodes of said first end cell, a second metal lead in electrical contact with one of said electrodes of said second end cell, the polarity of the electrode of said second end cell in contact with said second metal lead being different from the polarity of said electrode of said first end cell which is in contact with said first metal lead; and a second metal on the surfaces of one of said electrodes in each of said cells, said electrodes having said second metal on its surfaces being the same electrode in every cell, said extension of said receptacle electrodes being deformed adjacent the end of said receptacle electrodes and lying in a plane above and substantially parallel to the plane of the cell with which it is integrally connected, whereby the cells of said battery form a stack of cells.

* * * * *